UNITED STATES PATENT OFFICE 2,185,220

MEDICINAL AGENT

Fred P. Nabenhauer, Somerton, Pa., assignor to Smith, Kline & French Laboratories, Philadelphia, Pa., a corporation of Pennsylvania No Drawing. Application August 17, 1938, Serial No. 225,453

7 Claims. (Cl. 167—65)

This invention or discovery relates to medicinal agents having various uses in therapeutic treatment of animals and man.

Broadly speaking, I have discovered therapeutic utility in substances from the chemical class consisting of furfuryl or tetrahydrofurfuryl alkyl dimethylammonium salts, which will be made apparent by the following general formula:

where R is an alpha-furyl

or alpha-tetrahydrofuryl

group, R' is an alkyl group having 1–5 carbon atoms such as methyl, ethyl, propyl, isopropyl and the like, and X is an acid radical such as sulfate, acetate, nitrate, citrate, tartrate, iodide, bromide, etc.

Illustrative members of this class are:
1. Furfuryl trimethyl ammonium iodide
2. Furfuryl dimethylethyl ammonium tartrate
3. Furfuryl dimethylpropyl ammonium ethyl sulfate
4. Tetrahydrofurfuryl trimethyl ammonium bromide
5. Tetrahydrofurfuryl dimethylethyl ammonium nitrate.
6. Tetrahydrofurfuryl dimethylisopropyl ammonium acetate The furfuryl trimethyl ammonium iodide which is a particularly useful salt is represented by the following formula:

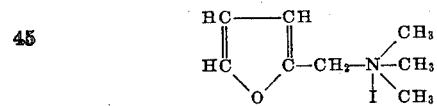

It is a crystalline solid having a melting point of 119° C. and is readily soluble in water, giving stable solutions. The corresponding tetrahydrofurfuryl trimethyl ammonium iodide has the following formula:

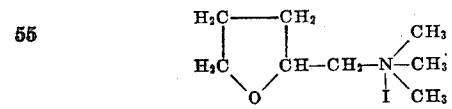

It, too, is a water soluble, crystalline solid, having a melting point of 122–124° C.

The medicinal remedies in accordance with this invention may be in various forms and variously administered. In most cases they are best given in dilute form which has the useful result of enabling convenient administration of the very small required quantities of the salt. Thus, for example, they may be administered orally in the form of an elixir or aqueous solution, with or without suitable diluents and flavoring material, for example, sugar and aromatic oils, in tablet form in admixture with suitable excipients, for example, lactose, starch, talc, gelatin, etc.; they may likewise be injected into or applied to body tissues, for example, in aqueous or saline solution.

From the standpoint of therapeutic and pharmacologic properties the medicinal remedies contemplated by this invention have been found to cause effects simulating those of stimulation of the neuro-muscular mechanisms under control of the parasympathetic nervous system, producing physiological effects qualitatively cholinergic or muscarinic in character, for example, peripheral dilatation usually resulting in a decrease in blood pressure; contraction of smooth muscle, particularly of the gastro-intestinal tract causing catharsis; increase or decrease in pulse rate; salivation; increase in leg volume; etc. Thus the compounds are useful for treatment of conditions of the human or animal system where any or all such effects are therapeutically effective and desirable.

In use of this medicinal preparation in accordance with this invention the dosage or amount administered will depend upon a number of factors. Thus, particular dosage will depend upon the condition of the patient to be relieved, the quantitative or qualitative effect to be produced, the specific composition selected for administration, the mode of administration and the patient's individual reaction to the particular composition and mode of administration.

In general, the above compounds contemplated by this invention are prepared by reacting an alkyl halide with furfuryl or tetrahydrofurfuryl dimethyl amines, recovering the alkyl dimethylammonium halide from the mixture and isolating it in pure crystalline form. If desired, an alkyl sulfate may be used in lieu of alkyl halides thereby producing alkyl dimethylammonium alkyl sulfates.

Likewise other salts of these quaternary ammonium compounds are prepared in various ways; for instance, the alkyl dimethylammonium halides mentioned ante are made by double decomposition of the halides with the silver salt of the acid to be introduced into the quaternary ammonium complex in place of the halogen atom. Silver oxide is used to prepare alkyl dimethylammonium hydroxides from the corresponding halides. These hydroxides, however, have a caustic alkalinity and are not generally useful therapeutically except in acid admixtures. They are however good intermediates where the salts of special acids are desired, such as oleates, tartrates, citrates, acetates, etc. In the case of the tartrates, acid reacting mono-hydrogen citrate and di-hydrogen citrate are possible in addition to the tribasic citrate.

More specifically and merely by way of examples the method of production of the compounds will be made apparent by the following:

*Example 1.*—For the preparation of furfuryl alkyl dimethylamonnium salts, the preparation of furfuryl trimethyl ammonium iodide is illustrative.

Furfuryl dimethyl amine is first produced. This may conveniently be accomplished by employing the Leuckart synthesis known to those skilled in the art which involves the use of an aldehyde or a ketone, and formate of ammonia or an amine, or corresponding formamide derived by dehydration of formate of ammonia or an amine.

For example, 5 moles of dimethyl amine and 5 moles of formic acid and water are distilled to 135° C.; distilling off most of the water. To the remaining liquid, consisting for the most part of the formyl derivative of dimethyl amine, 1 mole of furfural mixed with 1 mole of formic acid is slowly added with heating, the temperature being maintained at 150-170° C., until the reaction is complete. The mixture is then distilled into a receiver. The course of this reaction may be illustrated as follows:

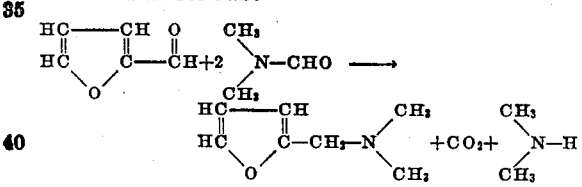

Part of the formic acid used in the above reaction functions to react with the dimethyl amine liberated in the reaction.

After the furfuryl has all been added and the reaction has subsided, the residue is cooled, diluted with water, made strongly alkaline and distilled until all volatile substances are removed. The distillate is then made acid with formic acid and distilled with steam as long as non-basic substances are carried over by the steam. The residue is then made strongly basic with caustic soda and the volatile amines again distilled with steam. The distillate is then treated with strong alkali and then extracted with ether to extract the base. The extract is dried by the addition of caustic potash, the ether removed and the residual amine purified by distillation. Furfuryl dimethyl amine boils over the range 145–150° C.

To obtain the quaternary salt, furfuryl dimethyl amine so prepared is dissolved in dry benzene and to the solution is added slightly more than one equivalent of methyl iodide. Inducement of crystallization of the quaternary salt which separates may be effected as, for example, by scratching the side of the vessel containing the mixture, or seeding with a small quantity of the crystalline quaternary salt. The course of the reaction may be illustrated as follows:

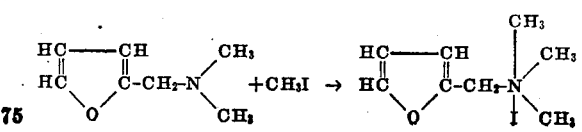

The various other furfuryl alkyl dimethylammonium halides contemplated by this invention are readily prepared by the substitution in the above reaction of suitable alkyl halides such as methyl, ethyl, propyl, etc., iodide, bromide, chloride or the like in lieu of methyl iodide.

Where pure amine and pure alkyl halide in dry benzene are used, the quaternary salt will separate out in pure form after a shorter or longer period, depending on the alkyl halide.

As illustrative of the preparation of furfuryl alkyl dimethylammonium alkyl sulfates, the tertiary amine prepared as described above is reacted with an alkyl sulfate instead of with an alkyl halide, on the basis of 1 mole of alkyl sulfate per mole of tertiary amine, with procedure as described above. Such salts will be found difficult to obtain in crystalline form; however, such form is not always essential for medicinal use.

As further illustrative of the preparation of organic and inorganic salts, other than the halides, such are prepared from the halides by double decomposition with the silver salt of the acid to be introduced into the quaternary ammonium complex. Thus, for example, sulfates, acetates, nitrates, tartrates, etc., of the various compounds are readily prepared with the desired alkyl dimethylammonium halide. The following example is illustrative:

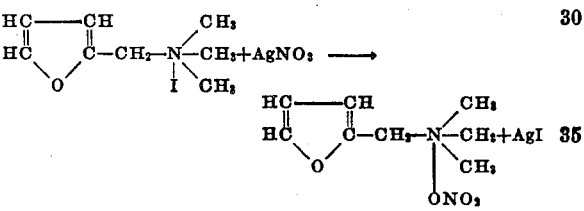

*Example 2.*—For the preparation of a tetrahydrofurfuryl alkyl dimethylammonium salt the following procedure for the production of tetrahydrofurfuryl trimethyl ammonium iodide is illustrative.

About 100 grams of tetrahydrofurfuryl alcohol, together with an equal weight of hydrobromic acid are heated under a reflux for several hours, say about three hours. The reaction occurring is expressed as follows:

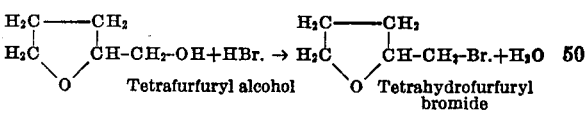

The product of the reaction above, tetrahydrofurfuryl bromide, will appear as an oil and is recovered by distilling the reaction mixture until oil ceases to distill off with the aqueous layer, separating the heavy oil and drying with calcium chloride.

The tetrahydrofurfuryl bromide so obtained is converted into tetrahydrofurfuryl dimethyl amine by heating 2 moles (379 gm.) of tetrahydrofurfuryl bromide with 3 moles of dimethyl amine dissolved in 600 cc. of ethyl alcohol. The heating is carried out in an autoclave for four hours at a temperature of 100–110° C. (35–40 lbs. pressure). Alcohol and excess dimethyl amine are then removed by distillation, water added and the product steam distilled to remove volatile substances. This reaction yields tetrahydrofurfuryl dimethyl ammonium bromide. This reaction is expressed as follows:

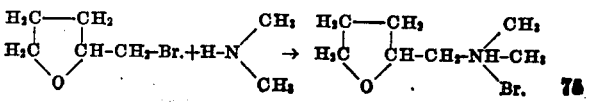

From the tetrahydrofurfuryl dimethyl bromide so produced, tetrahydrofurfuryl dimethyl amine is thrown out of solution by the addition of strong caustic and dried, first by shaking with 40 per cent sodium hydroxide and finally by allowing it to stand over sticks of caustic potash. The base is then purified by distillation, boiling at 158–161° at atmospheric pressure. This reaction is expressed as follows:

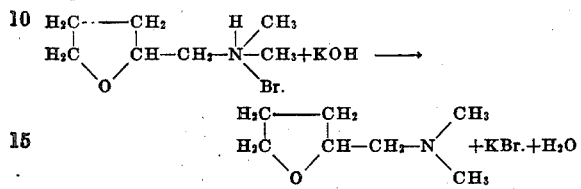

To obtain the quaternary salt, tetrahydrofurfuryl dimethyl amine so prepared is dissolved in a suitable solvent, as, for example, dry acetone, and adding an excess of methyl iodide. The quaternary salt will crystallize out and crystallization is desirably induced by scratching the vessel containing the mixture, or by seeding with a small quantity of the crystalline quaternary salt. The quaternary salt will recrystallize from solution and is desirably recrystallized from acetone.

The reaction for the production of tetrahydrofurfuryl trimethyl ammonium iodide, which has a melting point of 122–124° C., is expressed as follows:

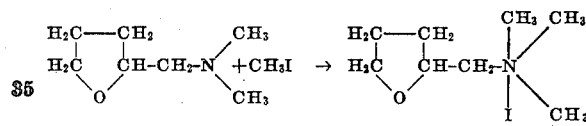

The various other tetrahydrofurfuryl alkyl dimethylammonium halides contemplated by this invention are readily prepared by the substitution in the above reaction of the suitable alkyl halides such as methyl, ethyl, propyl, etc., iodide, bromide, chloride, and the like in lieu of methyl iodide.

As illustrative of the preparation of tetrahydrofurfuryl alkyl dimethylammonium alkyl sulfates, the tertiary amine prepared as described above is reacted with an alkyl sulfate instead of with an alkyl halide, on the basis of 1 mole of alkyl sulfate per mole of tertiary amine, with procedure as described above. Such salts are also difficult to obtain in crystalline form, but this is not essential.

As further illustrative of the preparation of organic and inorganic salts, other than the halides, such are prepared from the halides by double decomposition with the silver salt of the acid to be introduced into the quaternary ammonium complex. Thus, for example, sulfates, acetates, nitrates, tartrates, etc., of the various compounds are readily prepared by double decomposition of their corresponding silver salts with the desired tetrahydrofurfuryl alkyl dimethylammonium halide. The following example is illustrative:

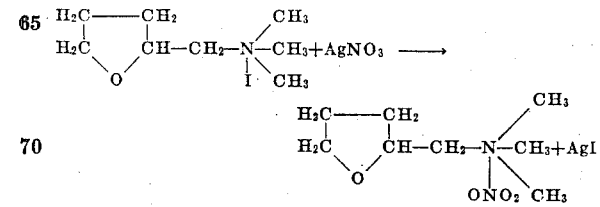

This application is a continuation-in-part of application filed by me, Serial No. 136,527, filed April 13, 1937.

What I claim is:

1. A medicinal agent capable of producing effects simulating those of stimulation of neuromuscular mechanisms under control of the parasympathetic nervous system, and producing physiological effects qualitatively cholinergic or muscarinic in character and physiological effects resulting therefrom, said agent comprising as the essential and therapeutically active ingredient thereof a compound from the group consisting of alkyl dimethylammonium salts having the following formula:

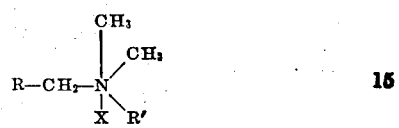

in which R is a group from the groups consisting of furfuryl or tetrahydrofurfuryl groups, R' is an alkyl group having 1–5 carbon atoms, and X is a radical of an acid producing non-toxic ions.

2. A medicinal agent capable of producing effects simulating those of stimulation of neuromuscular mechanisms under control of the parasympathetic nervous system, and producing physiological effects qualitatively cholinergic or muscarinic in character and physiological effects resulting therefrom, said agent comprising as the essential and therapeutically active ingredient thereof a compound from the group consisting of alkyl dimethylammonium salts having the following formula:

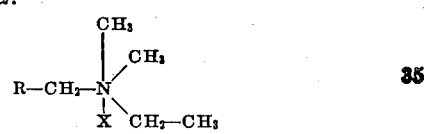

in which R is a group from the groups consisting of furfuryl or tetrahydrofurfuryl groups and X is a radical of an acid producing non-toxic ions.

3. A medicinal agent capable of producing effects simulating those of stimulation of neuromuscular mechanisms under control of the parasympathetic nervous system, and producing physiological effects qualitatively cholinergic or muscarinic in character and physiological effects resulting therefrom, said agent comprising as the essential and therapeutically active ingredient thereof a compound from the group consisting of alkyl dimethylammonium salts having the following formula:

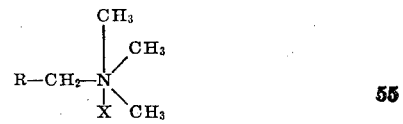

in which R is a group from the groups consisting of furfuryl or tetrahydrofurfuryl groups and X is a radical of an acid producing non-toxic ions.

4. A medicinal agent capable of producing effects simulating those of stimulation of neuromuscular mechanisms under control of the parasympathetic nervous system, and producing physiological effects qualitatively cholinergic or muscarinic in character and physiological effects resulting therefrom, said agent comprising as the essential and therapeutically active ingredient thereof a compound from the group consisting of alkyl dimethylammonium salts having the following formula:

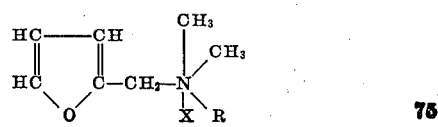

in which R is an alkyl group having 1 to 5 carbon atoms, and X is a halide.

5. A medicinal agent capable of producing effects simulating those of stimulation of neuromuscular mechanisms under control of the parasympathetic nervous system, and producing physiological effects qualitatively cholinergic or muscarinic in character and physiological effects resulting therefrom, said agent comprising as the essential and therapeutically active ingredient thereof a compound from the group consisting of alkyl dimethylammonium salts having the following formula:

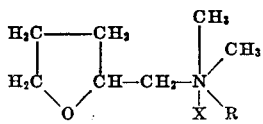

in which R is an alkyl group having 1 to 5 carbon atoms, and X is a halide.

6. A medicinal agent capable of producing effects simulating those of stimulation of neuromuscular mechanisms under control of the parasympathetic nervous system, and producing physiological effects qualitatively cholinergic or muscarinic in character and physiological effects resulting therefrom, said agent comprising as the essential and therapeutically active ingredient thereof a compound having the following formula:

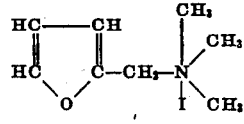

7. A medicinal agent capable of producing effects simulating those of stimulation of neuromuscular mechanisms under control of the parasympathetic nervous system, and producing physiological effects qualitatively cholinergic or muscarinic in character and physiological effects resulting therefrom, said agent comprising as the essential and therapeutically active ingredient thereof a compound having the following formula:

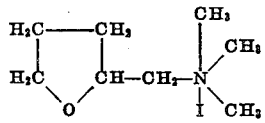

FRED P. NABENHAUER.